(12) United States Patent
Kimhi et al.

(10) Patent No.: US 12,175,795 B2
(45) Date of Patent: Dec. 24, 2024

(54) DEVICE AND METHOD FOR DETERMINING ENGAGEMENT OF A SUBJECT

(71) Applicant: DSP GROUP LTD., Herzelia (IL)

(72) Inventors: Tomer Kimhi, Tel Aviv (IL); Elad Baram, Shilat (IL); Yoram Zylberberg, Tel Aviv (IL)

(73) Assignee: DSP Group Ltd. (IL)

(*) Notice: Subject to any disclaimer, the term of this patent is extended or adjusted under 35 U.S.C. 154(b) by 327 days.

(21) Appl. No.: 17/577,448

(22) Filed: Jan. 18, 2022

(65) Prior Publication Data

US 2022/0230469 A1    Jul. 21, 2022

(30) Foreign Application Priority Data

Jan. 18, 2021 (IL) .......................................... 280256

(51) Int. Cl.
G06V 40/16 (2022.01)
G06F 3/01 (2006.01)
H04N 23/611 (2023.01)

(52) U.S. Cl.
CPC ............ *G06V 40/169* (2022.01); *G06F 3/013* (2013.01); *G06V 40/166* (2022.01); *H04N 23/611* (2023.01)

(58) Field of Classification Search
CPC .... G06V 40/169; G06V 40/166; G06V 40/16; G06V 40/18; G06F 3/00; G06F 3/013; G06T 7/73; H04N 23/611
See application file for complete search history.

(56) References Cited

U.S. PATENT DOCUMENTS

| | | | | |
|---|---|---|---|---|
| 8,552,850 | B2 * | 10/2013 | De Mers | A61B 5/18 340/576 |
| 9,906,722 | B1 | 2/2018 | Gigot | |
| 9,998,707 | B2 * | 6/2018 | Paragano | G06F 3/013 |
| 10,558,264 | B1 * | 2/2020 | Watson | H04N 13/156 |
| 10,831,926 | B1 * | 11/2020 | Zylberberg | H04N 23/57 |
| 10,848,681 | B2 | 11/2020 | Tang et al. | |

(Continued)

FOREIGN PATENT DOCUMENTS

| | | | | |
|---|---|---|---|---|
| JP | 2004303031 | A * | 10/2004 | |
| JP | 6717046 | B2 * | 7/2020 | G06F 3/013 |

(Continued)

OTHER PUBLICATIONS

JP 2004-303031 translation (Year: 2004).*

(Continued)

*Primary Examiner* — Carol Wang
(74) *Attorney, Agent, or Firm* — Paradice & Li LLP

(57) ABSTRACT

A device, a computer implemented method, and a computer program product, the device including a capture device configured for capturing an image, and a processor configured to: receiving at least a part of an image captured by the capture device, analyzing the at least part of the image to determine a looking direction of a subject at an object, based on the looking direction, determining an engagement level of a subject with the object, and outputting the engagement level or whether the engagement level is in compliance with a required engagement level, while disabling transmission of information that enables reconstruction of the at least part of the image.

20 Claims, 4 Drawing Sheets

(56) References Cited

U.S. PATENT DOCUMENTS

| | | | |
|---|---|---|---|
| 2004/0081338 A1 | 4/2004 | Takenaka | |
| 2009/0153692 A1 | 6/2009 | Koide | |
| 2009/0259865 A1 | 10/2009 | Sheynblat et al. | |
| 2011/0134251 A1 | 6/2011 | Kim et al. | |
| 2011/0298702 A1* | 12/2011 | Sakata | G06T 7/74 |
| | | | 345/156 |
| 2012/0265616 A1* | 10/2012 | Cao | G09F 27/00 |
| | | | 705/14.58 |
| 2012/0327248 A1 | 12/2012 | Tack et al. | |
| 2013/0156273 A1 | 6/2013 | Nielsen | |
| 2013/0243270 A1* | 9/2013 | Kamhi | H04N 21/458 |
| | | | 382/118 |
| 2014/0108309 A1* | 4/2014 | Frank | G06Q 50/01 |
| | | | 706/12 |
| 2014/0168372 A1 | 6/2014 | Chang et al. | |
| 2015/0116212 A1* | 4/2015 | Freed | G06F 21/6245 |
| | | | 345/156 |
| 2015/0154445 A1* | 6/2015 | Biswas | G06F 3/1454 |
| | | | 345/2.3 |
| 2015/0206415 A1 | 7/2015 | Wegelin | |
| 2016/0065903 A1* | 3/2016 | Wang | G06F 3/013 |
| | | | 348/148 |
| 2016/0210503 A1 | 7/2016 | Yin et al. | |
| 2016/0371504 A1 | 12/2016 | Huang et al. | |
| 2017/0061210 A1 | 3/2017 | Ollila | |
| 2017/0140221 A1 | 5/2017 | Ollila | |
| 2017/0195629 A1* | 7/2017 | Wexler | H04W 4/029 |
| 2017/0230551 A1 | 8/2017 | Akkaya et al. | |
| 2017/0324901 A1 | 11/2017 | Mandelli | |
| 2018/0007255 A1 | 1/2018 | Tang | |
| 2018/0124327 A1 | 5/2018 | Alasirnio et al. | |
| 2018/0173986 A1 | 6/2018 | Gousev et al. | |
| 2018/0189547 A1 | 7/2018 | Daniels et al. | |
| 2018/0336698 A1 | 11/2018 | Park et al. | |
| 2018/0350036 A1 | 12/2018 | VanReenen et al. | |
| 2019/0044906 A1 | 2/2019 | Maeda et al. | |
| 2019/0068908 A1 | 2/2019 | Kobayashi et al. | |
| 2019/0095695 A1* | 3/2019 | Iwanami | G06V 40/16 |
| 2019/0130184 A1* | 5/2019 | Samanta | G02B 27/0093 |
| 2019/0155495 A1* | 5/2019 | Klein | G06F 9/451 |
| 2019/0210563 A1 | 7/2019 | Slovesko | |
| 2019/0258314 A1 | 8/2019 | Ollila et al. | |
| 2019/0364229 A1 | 11/2019 | Stec et al. | |
| 2020/0057943 A1 | 2/2020 | Fridental et al. | |
| 2020/0228753 A1 | 7/2020 | Ortiz Egea et al. | |
| 2021/0027337 A1* | 1/2021 | Nannichi | G06Q 30/0269 |

FOREIGN PATENT DOCUMENTS

| | | | |
|---|---|---|---|
| KR | 20180002449 A | | 1/2018 |
| WO | WO-2017152215 A1 | * | 9/2017 |

OTHER PUBLICATIONS

Kellnhofer, Petr, Adria Recasens, Simon Stent, Wojciech Matusik, and Antonio Torralba. "Gaze360: Physically unconstrained gaze estimation in the wild." In Proceedings of the IEEE/CVF international conference on computer vision, pp. 6912-6921. 2019. (Year: 2019).*

Raynal, Mathilde, Radhakrishna Achanta, and Mathias Humbert. "Image obfuscation for privacy-preserving machine learning." arXiv preprint arXiv:2010.10139 (2020). (Year: 2020).*

Lapray et al., "Multispectral Filter Arrays: Recent Advances and Practical Implementation," Sensors 2014, 14(11), pp. 21626-21659.

Lu et al., "Designing Color Filter Arrays for the Joint Capture of Visible and Near-Infrared Images," In Proceedings of the IEEE International Conference on Image Processing (ICIP), 2009, pp. 3797-3800.

U.S. Appl. No. 62/924,188, filed Oct. 22, 2019, entitled "Dual Mode Object Recognition", 19 pgs.

U.S. Appl. No. 17/076,828, filed Oct. 22, 2020, entitled "Dual Mode Object Recognition", 27 pgs.

U.S. Appl. No. 16/706,872, filed Dec. 9, 2019, entitled "Privacy Proof Visual Sensor", 21 pgs.

* cited by examiner

DEVICE AND METHOD FOR DETERMINING ENGAGEMENT OF A SUBJECT

CROSS-REFERENCE TO RELATED APPLICATION

This application claims priority to Israel Patent Application No. 280256, filed on Jan. 18, 2021, which is incorporated herein by reference in its entirety.

FIELD

The invention relates to imaging devices in general, and more particularly to engagement determining imaging devices.

BACKGROUND

Nowadays many devices and applications comprise and use cameras. Cameras are contained in mobile devices such as mobile phones, laptops, tablets, or the like, as well as in fixed devices such as security systems, admission control systems, and others. In addition, due to the small form factor, cameras may be and often are embedded in object of almost any size while continually becoming more capable. Thus, a person may not realize a camera is recording and analyzing his movements.

Many devices execute advanced applications that require capturing images, for example video conferences, access control applications, or the like. Such applications may or may not require the subject to be present in front of the camera, and may or may not require the subject to look at the device. In fact, a conflict of interest is present between using such advanced applications on the one hand and respecting the subject's privacy on the other.

SUMMARY

One exemplary embodiment of the invention is a device including a capture device configured for capturing an image, and a processor configured to receiving at least a part of an image captured by the capture device, analyzing the at least part of the image to determine a looking direction of a subject at an object, based on the looking direction, determining an engagement level of a subject with the object, and outputting the engagement level or whether the engagement level is in compliance with a required engagement level, while disabling transmission of information that enables reconstruction of the at least part of the image. Within the device, the capture device optionally includes a visual sensor. Within the device, the capture device optionally includes a privacy-proof visual sensor. Within the device, the object is optionally a computing platform. Within the device, the object is optionally an item displayed in a retail store. Within the device, the object is optionally attached to a clothing item. Within the device, the processor is optionally further configured to determine whether the engagement level is in compliance with a required engagement level. Within the device, the required engagement level is optionally that the subject is facing the object. Within the device, the required engagement level is optionally that the subject is watching the object. Within the device, determining whether the subject is watching the computing platform is optionally determined by the subject's eyes being directed to the object. Within the device, the subject's eyes are optionally being directed to an area within a predetermined offset range from the capture device. Within the device, determining whether the subject is watching the computing platform is optionally determined by the direction of a feature of the subject's face. Within the device, the required engagement level is optionally that the subject is watching the object for at least a predetermined length of time. Within the device, the processor is optionally further configured to determine from a plurality of images information about engagement level of a plurality of subjects with the object. Within the device, the information optionally includes a number or duration of times the plurality of subjects watched the object. Within the device, the processor is optionally further configured to change an appearance of the object or part thereof subject to the engagement level of the subject being in compliance with a required engagement level. Within the device, the processor is optionally further configured to issue an alert subject to the engagement level of the subject being in compliance with a required engagement level. The device is optionally incorporated into a system which is not permanently connected to the electrical network.

Another exemplary embodiment of the invention is a computer implemented method including receiving at least a part of an image captured by a capture device associated with a computing platform, analyzing the at least part of the image to determine a looking direction of a subject at an object, based on the looking direction, determining an engagement level of a subject with the object, and outputting the engagement level or whether the engagement level is in compliance with a required engagement level, while disabling transmission of information that enables reconstruction of the at least part of the image.

Yet another exemplary embodiment of the invention is a non-transitory computer readable medium retaining program instructions, which instructions when read by a processor, cause the processor to perform a method including receiving an image captured by a capture device associated with a computing platform, analyzing the image to determine a looking direction of a subject at an object, based on the looking direction, determining an engagement level of a subject with the object, and outputting the engagement level or whether the engagement level is in compliance with a required engagement level, while disabling transmission of information that enables of the at least one image.

BRIEF DESCRIPTION OF THE DRAWINGS

The invention will be understood and appreciated more fully from the following detailed description taken in conjunction with the drawings in which corresponding or like numerals or characters indicate corresponding or like components. Unless indicated otherwise, the drawings provide exemplary embodiments or aspects of the invention and do not limit the scope of the invention. In the drawings.

DETAILED DESCRIPTION

Figure 1:
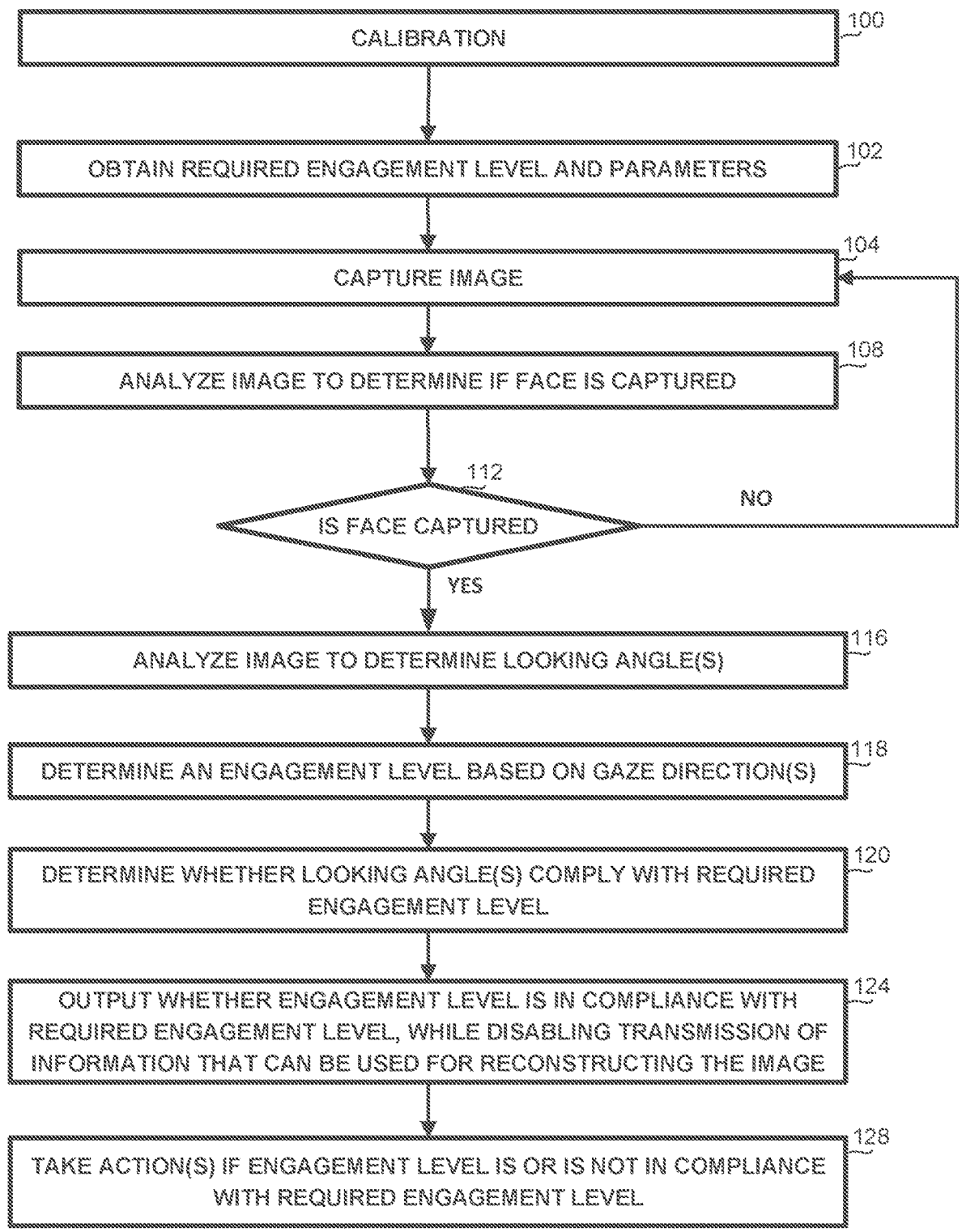
FIG. 1 is a generalized a flowchart of steps in a method for assessing and using the engagement level of a subject in accordance with some exemplary embodiments of the invention.

With the proliferation of capture devices and in particular digital cameras, and the advanced usage modes thereof in a variety of devices and applications, come new needs and challenges. One outstanding example is that such new applications and possibilities should not compromise the privacy of captured subjects.

One technical problem dealt with by the invention relates to the need to identify whether a subject's face is captured by the capture device. In particular, if the subject is indeed present and is facing the camera, it may be required to know the subject's engagement level with an object on or near which the camera is present (for example, a device where the camera is located just under or just above that screen) or another object the subject may engage with. For example, it may be required to know whether the subject is in front of the object containing the camera, the subject's face is in front of the object, the subject is facing the object, or the subject is looking at the camera or another part of the object. The engagement level may represent the subject's interest or involvement in the object or in displayed content. Thus, engagement level may also be referred to as attention level, responsiveness level, involvement level, or similar terms. However, as mentioned above and as also applicable to other technical problems, determining the engagement level of the subject should not compromise the subject's privacy. It will be appreciated that the privacy requirements may vary in accordance with the situation, the application, or other parameters.

Another technical problem relates to the need to know how many times, or how often, and for how long the subject is in this engagement level.

Yet another technical problem relates to the need of a person or an institute organizing, teaching or otherwise involved in a video conference, to gather statistics of the engagement level of the participants with the conference. For example, it may be important for them to know how many of the participants are actually present in front of the computing platform through which they connect to the conference, and how many are indeed looking at the screen and in particular at the area of the screen in which the speaker or the presentation are shown. The statistics may be momentary, ongoing, accumulated for the whole duration of the conference, accumulated for a particular participant of a particular conference, accumulated for a particular participant over time, or otherwise aggregated, without providing any identifying details and thus maintaining the privacy of the participants.

Yet another technical problem relates to the need to know the exposure statistics of still objects. For example, a retailer may wish to know how much attention one or more objects displayed in a store are attracting, for example how many people look at an area where certain merchandise is displayed, for how long, or the like.

Yet another technical problem relates to the need of certain individuals at certain times to know whether they are being watched. For example, a law officer, a person walking alone, or others, may want to know whether they are being watched for more than an occasional glance, and may also wish to receive a corresponding alert.

In addition, identifying the engagement level may be particularly required in battery-operated devices, or in other situations where power consumption is an issue. For example, a displayed item is unlikely to have a power source, a mobile device or a laptop computer are not permanently connected to the electricity network, or the like.

Thus, a solution may need to be feasible for autonomous devices with low power consumption that can be operated without connection to electricity or communication cables.

In one embodiment the invention relates to receiving a captured image or a sequence of images, and analyzing one or more of the captured images. Analysis may refer to whether a head of an individual is captured, which may be performed by searching for a generally oval shape, and more particularly to whether the individual is facing the capture device which may be performed by searching for facial features, such as eyes, nose or mouth, as is known in the art. If the person is indeed facing the camera, the image or a plurality of images may be further analyzed to determine whether the individual is watching the camera, another part of the object on which the camera is installed or another object of interest. The looking direction, sometimes known as gaze direction, may be determined, in non-limiting examples, in accordance with the user's facial features, including nose, eyes, ears, forehead, chin, etc., to determine whether they are looking down, sideways, upwards, directly, or at any specific direction. This can be achieved in several well known techniques, including by training a neural network. In further embodiments, if high quality and high resolution images are available, the direction may be determined by observing the location of the iris and/or the pupil relative to the eye boundaries. For example, a larger gap between the lower boundary of the eye and the iris and a smaller or no gap between the upper boundary of the eye and the iris may indicate that the person is looking up, and vice versa. Similar analysis may indicate that the subject is looking sideways. It will be appreciated that the invention is not limited to any one or more ways of determining the looking direction of a captured subject. In some embodiments, the engagement level may also be determined in accordance with a pose of the subject's head, as may be expressed using one, two or three angles, such as roll, pitch and/or yaw.

Once the looking direction is determined, an action may be taken subject to the looking direction being compliant or incompliant with a required looking direction. For example, the statistics of the people in a video conference looking in the direction of the speaker may be collected.

In another example, a button or another object on an item displayed in a store may change its appearance if the user is looking directly at it, or a promoting message may be displayed on or near the item. In further embodiments, the retailer may collect statistics about the number of times or the duration an item has been looked at, or the like.

In yet another example, a camera may detect whether a subject is looking at a user for more than a predetermined period of time.

In one embodiment the invention relates to implementing the invention with a low power consumption device, such that it may be used also with devices which are not connected to the electrical network, such as a device attached to a displayed item or to a clothing item, a mobile phone, a laptop computer, or the like. Some exemplary embodiments of such devices may be found in U.S. Patent Application No. 62/924,188 filed Oct. 22, 2019 titled "Dual Mode Object Recognition", and in U.S. patent application Ser. No. 17/076,828 filed Oct. 22, 2020 and titled "Dual Mode Object Recognition", both applications assigned to the same assignee as the current application, and incorporated herein in reference in their entirety and for any purpose.

In one embodiment the invention relates to the subject's required gaze direction being other than the camera, but rather at an area of interest. For example, a participant in a conference video is not expected to look at the camera, which is often located at the top or at the bottom of the display device, but rather downwards or upwards, respectively, within a certain angle range, towards the center of the display device, where the speaker or presentation may be shown.

Thus, in accordance with some embodiments of the invention, a calibration stage may take place, in which the range of angles acceptable for assuming that a subject is looking in a required direction may be determined. The range(s) of angles may be entered numerically, using a graphic user interface, or by a special procedure. Calibration may include a stage of setting numerical parameters, training an artificial Intelligence (AI) engine such as a neural network or a deep neural network, or the like. In further embodiments, the looking direction may be entered by a subject being asked to look in predetermined directions, for example at the boundaries of the area of the display device in which the speaker or presentation is shown, and the angle ranges may be noted.

In some exemplary situations, a camera may be installed on a button or another object attached to an item in a store, but a subject looking at the item is not expected to look directly at the object, but may look anywhere on the object, which may be within a certain range of angles in each direction.

In one embodiment the invention relates to determining compliance or incompliance with a desired looking direction based on a continuous or non-continuous stream of images captured during a period of time. For example, the user may be considered as having a certain engagement level with the device if he was looking in an expected direction in at least a predetermined part of the images taken through a predetermined period of time.

In one embodiment the invention relates to a method and device for assessing the engagement level of a subject with the device, and comparing the same to a required engagement level.

In one embodiment the invention relates to using the engagement level of the subject in a variety of ways, for example reporting or collecting statistics about the engagement level. In another example, the engagement level may be used for purposes such as attracting the subject's attention by changing the appearance of an item when the engagement level is as required, or the like.

This may provide surprising and valuable results, such as increasing a subject's attention to an item, providing attention statistics to a presenter in a virtual conference such that the presenter can enhance or otherwise improve the presentation, or the like.

In one embodiment the invention relates to determining the engagement level of a subject without violating or compromising the privacy of the subject, e.g., without storing or transmitting a recognizable image of the subject.

Referring now to FIG. 1, showing a flowchart of steps in a method for assessing and using the engagement level of a subject, in accordance with some exemplary embodiments of the invention. The method may be performed by a processor of a computing platform having an embedded capture device, a processor of a computing platform being operatively connected to a capture device, or a processor receiving images from any other source, such as a storage device, over a network or the like.

On step 100, a calibration stage many be performed, for example by a processor displaying a user interface for providing instructions to a subject. In some embodiments, during calibration a subject may be requested to look at the boundaries of a display area, one or more subjects' faces may be captured, and the gazing directions may be determined or estimated, and optionally stored for later comparison. Subsequently, given a certain direction the user is looking at, it may be determined whether the user is watching the display area, and thus may be assumed to be engaged with the presentation. The calibration may be specific to a subject, for example when installing a video conference application on a computing platform, in order to obtain the specific angles of the subject's eyes. In such cases, calibration may also take into account the subject's specifics, for example strabismus. In some embodiments, calibration may be performed as a pre-stage, for example at the factory or during installation of a device, and is not subject-specific. In further embodiments, calibration may be omitted.

On step 102, a required engagement level and parameters thereof may be obtained. For example, an engagement level may be "fully engaged", or "actively watching", and the associated parameters may be the angles between which the subject needs to watch such that the subject may be considered "actively watching", for example within the display area of a presentation. In another example, a "watching" engagement level may be obtained, which may be associated with the user's face being captured, but wider ranges of looking angles may be accepted, or a "present" engagement level, which may be associated with just the subject's head being captured.

On step 104 an image may be captured using a capture device, such as a camera, a video camera, or the like. The image may be one or more still images. In some embodiments, multiple images may be captured and analyzed, for example multiple video frames.

On step 108, one or more of the images or parts thereof may be analyzed to determine whether a face of a subject is captured. It will be appreciated that in some exemplary embodiments one or more preliminary steps may take place, for example determining motion within the sequence of images, determining whether a subject's head is present, or the like.

If no face is captured, execution may return to step 104 where another image is captured and analyzed. In some embodiments, not all images may undergo the determination whether a face is captured. For example, only every n-th image may be processed, an image may be processed every predetermined period of time, or the like.

If a face is recognized, then on step 116 the one or more images or parts thereof may be analyzed to determine the gaze direction(s), also referred to as gaze angle(s), looking direction(s) or looking angle(s) of the subject towards the object of interest, such as the screen. The gaze angles may be determined from facial landmarks, such as pupils, nose, mouth corners, or the like.

On step 118, an engagement level may be determined based on the looking direction.

On step 120, it may be determined whether the looking direction(s) complies with the parameters of the required engagement level, as obtained on step 102, for example, whether the looking angle is within the range of angles associated with "fully engaged" or "actively watching".

In some embodiments, steps 118 and 120 may be performed together, for example the looking direction may be compared to stored looking directions associated with a required engagement level, to determine compliance with the engagement level.

On step 124, it may be output whether the looking angle(s) comply with the required engagement level. The output may be provided to another component within the processor, to another computing platform, to a storage device, over the network or the like. However, the output may be provided while disabling transmission of the image or the part thereof or of any other information that enables reconstruction of the image or the part of the image, thereby protecting the user's privacy. Such disabling may be implemented, for example, as disclosed in U.S. patent application Ser. No. 16/706,872 filed Dec. 9, 2019 and titled "Privacy Proof Visual Sensor" assigned to the same assignee as the current application, and incorporated herein in reference in their entirety and for any purpose.

On step 128, one or more actions may be taken if the engagement level is or is not in compliance with the required engagement level, possibly over a period of time. For example, a student not concentrating on a virtual class may be notified accordingly, a student concentrating over a predetermined number of virtual classes may receive extra credit, an enforcement office may receive a notice if someone is gazing at him, or the like.

Figure 2:
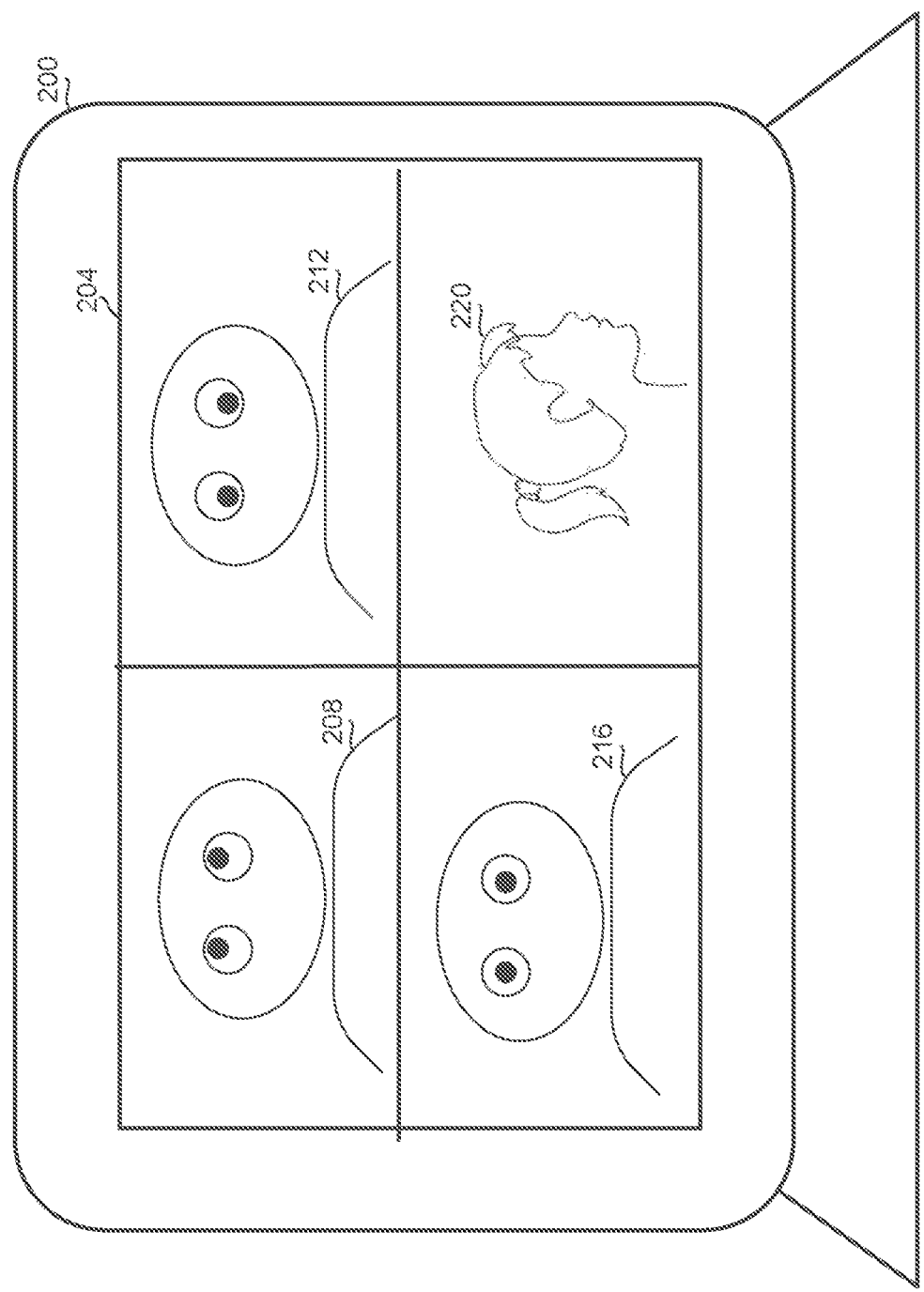
FIG. 2 is a schematic illustration exemplifying the usage of the engagement level of a subject, in accordance with some exemplary embodiments of the invention.

Referring now to FIG. 2, showing an illustrative example of a usage of the engagement level of a subject, in accordance with some exemplary embodiments of the invention.

FIG. 2 shows a display device 200, such as a display associated with a computing platform. Display device 200 shows a screen 204 of a video conferencing application, the screen showing four participants, 208, 212, 216 and 220. Participant 208 is looking upwards, participant 220 is looking sideways, participant 216 is looking straight into the camera, and participant 212 is looking downwards. Assuming that all participants use a single screen having a camera at the top part of the screen, it may seem that only participant 212 is looking at the speaker/presentation area of the screen. It will be appreciated that the gazing direction determination does not necessarily require that the subject's eyes are visible, for example the subject may be looking down or sideways. In addition, the gazing direction determination is not limited to any one or more manners, and may be determined in a multiplicity of ways, such as but not limited to facial detection, eye direction analysis, nose detection, or others. It will be appreciated that while in a video conference with few participants it is easy to track how many are engaged with the conference, in larger events, for example events with tens, hundreds or more participants, this is infeasible, neither in real time nor later on.

In some embodiments, a system associated with the invention and installed within the computing platform of a participant may analyze the captured images and report to a server of the video conference whether the participant is present in front of the screen, and whether the participant is watching the speaker/presentation (and is thus assumed to be fully engaged in the conference). This scenario can take place, for example in an intra-organization situation in which the organization installs the system, and controls the conferences. The information collected regarding the engagement level of the participants, which may comprise statistics and/or identifying details of the participants, may be provided to the organization, to the speaker or to another entity, and may be used for collecting statistics, evaluating the speaker or the subject, changing the course, tone, or progress speed of the presentation, improving the presentations, collecting statistics about users, for example for suggesting more suitable presentations to each user based on the presentations in which the user demonstrated higher engagement level, or the like.

In some embodiments, during installation of the system the user may be allowed to perform a calibration process. During calibration, the user may be asked to install and use the application as he expects to do, for example watch a demo presentation. The calibration application may mark the boundaries of the areas of the screen the user expects the conferences to be displayed on, and the user may be prompted to look at these marks. The user's eyes shape and position may be captured when looking at the marks, and the relevant angles or other parameters may be stored by the application. However, in some situations calibration is impossible or infeasible, for example when collecting statistics about the exposure level of items in a store.

Once calibration has been performed, the situation of FIG. 2 may be interpreted differently. For example, it may be deduced that participant 220 is looking at one screen while his camera is installed on another screen, such that she may also be fully engaged with the application.

Figure 3:
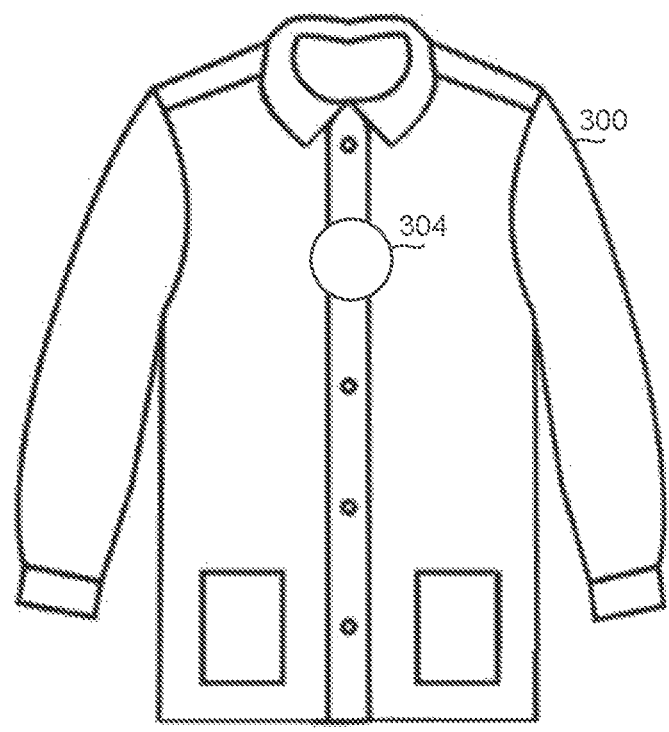
FIG. 3 is a schematic illustration exemplifying another usage of the engagement level of a subject, in accordance with some exemplary embodiments of the invention.
Figure 3:
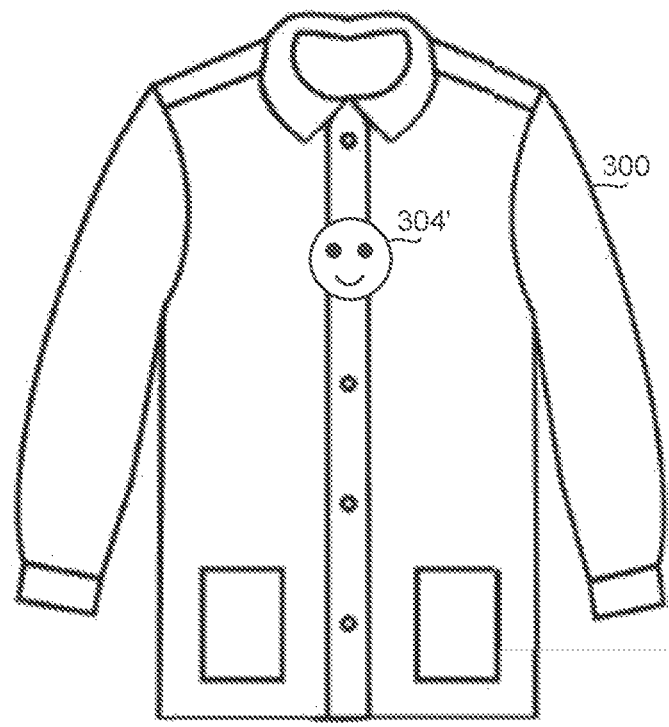

Referring now to FIG. 3, showing another illustrative example of a usage of the engagement level of a subject, in accordance with some exemplary embodiments of the invention.

FIG. 3 shows a shirt 300, having a button 304. It will be appreciated that the example is not limited to a shirt, but can be any clothing item or any other displayed item such as an information or advertising board, a museum display, an appliance, or the like.

Button 304 may be equipped with a capture device and a processor for receiving and processing the captured image, such that the capture device may capture a subject looking at shirt 300. Upon determining that a subject has looked at shirt 300, or has looked at shirt 304 for a period of time exceeding a threshold, an action may be taken. In some embodiments, button 304 may receive a command to change its appearance, for example display an emoji, change its color, play a sound, display a touch-screen or the like.

In further embodiments, an indication to the look by the subject, including for example the duration of time the subject has looked at the button, may be provided, for example to the retailer. The retailer may thus collect statistics about attractive and unattractive displayed items, which items attract attention by shoppers and for how long, or the like.

In further embodiments, the camera may be located not necessarily on button 304 but anywhere else, whether on the displayed item or not, and whether it is noticeable by the subject or not, as long as it may capture an image from which it may be analyzed whether and at what direction the subject is looking at the item.

Another exemplary embodiment relates to a camera located on a clothing item of a user, such as on the back or shoulders of the uniform of a law enforcement officer or a person walking alone in a dark place. The images captured by the camera may be analyzed to determine whether a subject is watching the user, and if the subject is watching the user for at least a predetermined period of time, an alert may be provided, for example by sounding a siren, turning on a light, sending a message, or the like.

In some embodiments, the image analysis, in addition to determining that a subject is engaged with the device, may also determine whether the subject is a man, a woman, a child, or another category, and may take a different action for different categories. For example, in a store, a different emoji may be displayed on a button depending on whether the subject is a man, a woman or a child.

Figure 4:
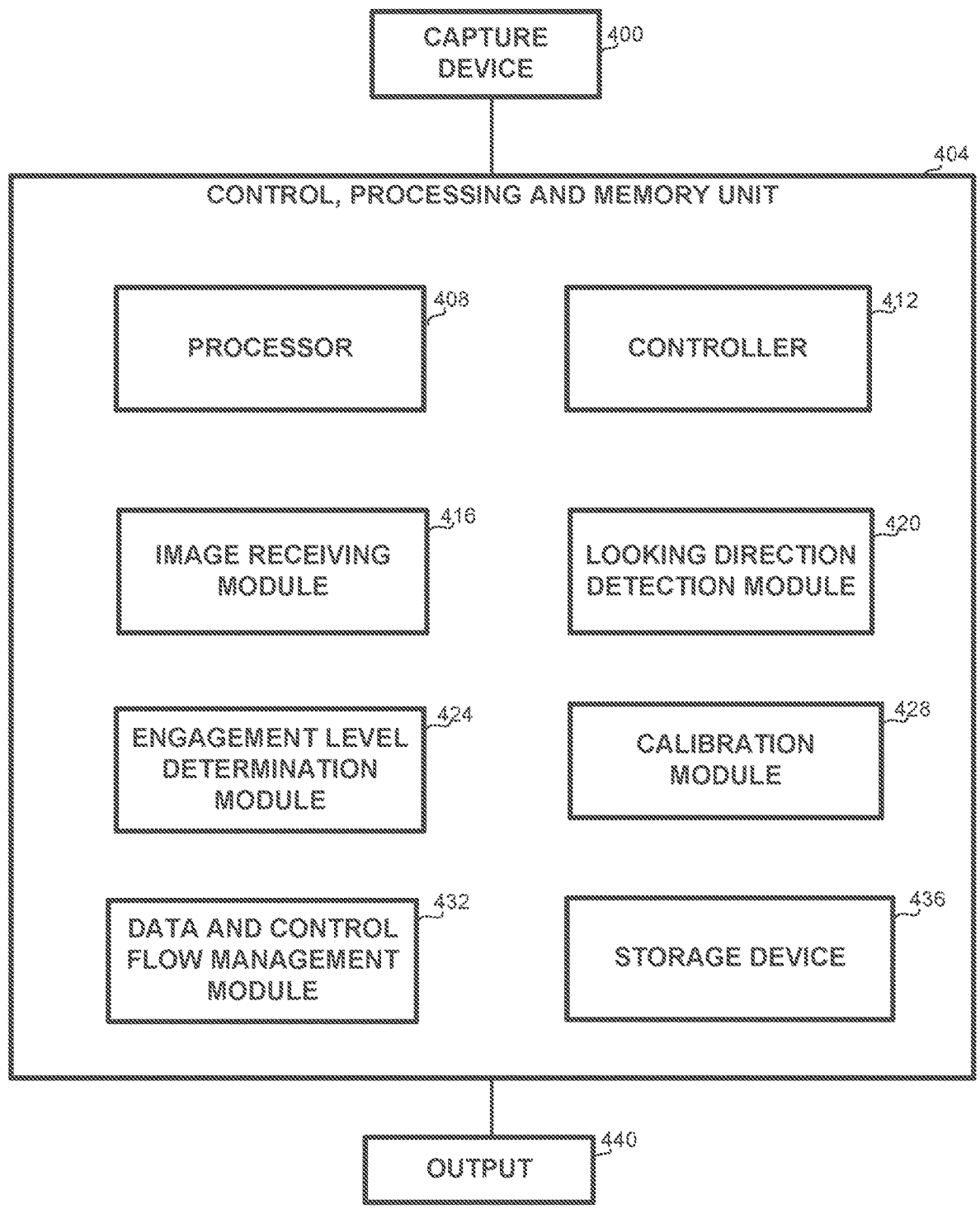
FIG. 4 is a block diagram of a system for assessing and using the engagement level of a subject, in accordance with some exemplary embodiments of the invention.

Referring now to FIG. 4, showing a schematic block diagram of a system for assessing and using the engagement level of a subject, in accordance with some exemplary embodiments of the invention.

The system may be implemented within a privacy-proof sensor which does not violate the privacy of the subject, such as a system described in U.S. Pat. No. 10,831,926 filed Dec. 9, 2019 titled "Privacy Proof Visual Sensor", and assigned to the same assignee as the current application.

The system may be implemented as part of any camera-equipped device, including but not limited to battery operated devices, embedded systems, or the like.

The system may include a capture device 400, such as an interface to a video dataset, to an image dataset, to a camera, to a video camera, or the like. Capture device 400 may provide images, such as still images, frames from a video stream, or the like.

The system may comprise a controller that may be the unique source that can access the camera and provide data. The controller may limit the volume of data that is output per each captured image, so that only a limited number of bits of the image may be output, which are insufficient for reconstructing the image, and in particular in high resolution. Additionally or alternatively, the controller may limit the output to indications provided by one or more analysis engines.

The output may be limited by etching or hard coding into the camera processor a controller that maintains one or more output limitations, such that the controller cannot be replaced or updated. The controller may be implemented in hardware. Alternatively, the controller may be configurable to the specific unit and specific needs, but locked once installed, using for example an e-fuse mechanism, such that it cannot be replaced or hacked.

The device may also comprise control, processing and memory unit (CPMU) 404. CPMU 404 may be implemented as one or more computing platforms. In some embodiments, CPMU 404 or components thereof may be embedded within capture device 400 or collocated with capture device 400, however, CPMU can also be separated form capture device 400.

CPMU 404 may comprise one or more processors 408, such as one or more Central Processing Units (CPUs), microprocessors, Graphical Processing Units (GPU)s, electronic circuits, Integrated Circuits (IC) or the like. Processor 408 may be configured to provide the required functionality, for example by loading to memory and executing the modules stored on storage device 432 detailed below.

It will be appreciated that CPMU 404 may be implemented as one or more computing platforms which may be in communication with one another. It will also be appreciated that processor 404 may be implemented as one or more processors, whether located on the same platform, collocated platforms, remote platforms, on a cloud computing device, or in any other manner.

CPMU 404 may comprise a storage device 436, such as a hard disk drive, a Flash disk, a Random-Access Memory (RAM), a memory chip, or the like.

Controller 412 may also be operative in taking actions in cases where the engagement level of the subject is as required, or is not as required. Controller 412 may be operative in interfacing with other systems or modules, such as raising an alert, sending statistics, or the like.

Image receiving module 416 may be operative in receiving and optionally storing one or more compressed images or parts thereof received from capture device 400.

Gaze direction detection module 420 may be operative in analyzing a received image and determining whether the image captures a human face. If the image indeed captures a human face, looking direction detection module 420 may determine a looking direction of the captured human. The looking direction may be expressed in one or more spatial angles, or in a coarser manner, such as "straight", "up", "down", "left", and "right", or in a finer resolution, such as "weak left", "strong left", etc.

Engagement level detection module 424 may determine an engagement level associated with the looking direction of the subject, and whether the engagement level is equal to a required engagement level. Determining the engagement level, or its compliance with the required engagement level may utilize parameters stored within and extracted from storage device 436.

Calibration module 428 may be operative in prompting a user to look at certain directions, such as the boundaries of a presentation area of a conferencing application, or the like. Once the user indicates that he or she is looking in a required direction, one or more images may be captured and analyzed, and one or more looking directions or parameters thereof may be noted and stored within storage device 436, for example the distances between the iris and the eye boundaries, the ratio between the distances, other parameters of the user's face, or the like.

Data and control flow management module 432 may be operative in managing the activation of the various modules at the required circumstances and with the required data, for example prompting the user to calibration when the device is installed, providing the required engagement level such that engagement level detection module 424 may determine if the user is engaged as required, or the like.

It will be appreciated that modules 416, 420, 424, 428, and 432 may be stored on or loaded to storage device 436, and executed by processor 408. It will also be appreciated that in one or more applications some of the modules may be omitted or not used.

It will be appreciated that the invention does not limit any other usage of a system including a capture device and a processor, such as identification of a captured subject, transmission of captured images or parts or characteristics thereof, or the like.

The invention may be a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including wired or wireless local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device comprising:
an image capture device;
a processor configured to:
  receive at least a portion of an image captured by the image capture device,
  analyze the received portion of the image to determine a looking direction of a subject at an object,
  based on the looking direction, determine an engagement level of the subject with the object, and output image data associated with the image and an indication of whether the determined engagement level is in compliance with a required engagement level; and a controller implemented in hardware logic or hard coded into a chip, the controller being configured to limit an amount of the image data output by the processor so that the amount is insufficient for reconstruction of the received portion of the image.

2. The device of claim 1, wherein the image capture device comprises a visual sensor.

3. The device of claim 1, wherein the image capture device comprises a privacy-proof visual sensor.

4. The device of claim 1, wherein the object is a computing platform.

5. The device of claim 1, wherein the object is an item displayed in a retail store.

6. The device of claim 1, wherein the object is attached to a clothing item.

7. The device of claim 1, wherein the processor is further configured to determine whether the determined engagement level is in compliance with the required engagement level.

8. The device of claim 1, wherein the required engagement level is that the subject is facing the object.

9. The device of claim 1, wherein the required engagement level is that the subject is watching the object.

10. The device of claim 9, wherein the object is a computing platform, and determining whether the subject is watching the computing platform comprises determining whether eyes of the subject are being directed to the computing platform.

11. The device of claim 10, wherein determining whether the eyes of the subject are being directed to the computing platform comprises determining whether the eyes of the subject are directed to an area within a predetermined offset range from the image capture device.

12. The device of claim 10, wherein determining whether the subject is watching the computing platform comprises determining a direction of a feature of a face of the subject.

13. The device of claim 1, wherein the required engagement level is that the subject is watching the object for at least a predetermined length of time.

14. The device of claim 1, wherein the processor is further configured to determine, from a plurality of images, information about an engagement level of a plurality of subjects with the object.

15. The device of claim 14, wherein the information comprises a number or duration of times the plurality of subjects watched the object.

16. The device of claim 1, wherein the processor is further configured to change an appearance of the object or a part thereof in response to the determined engagement level of the subject being in compliance with the required engagement level.

17. The device of claim 1, wherein the processor is further configured to issue an alert in response to the determined engagement level of the subject being in compliance with the required engagement level.

18. The device of claim 1, wherein the device is incorporated into a system which is not permanently connected to an electrical network.

19. A computer implemented method comprising:

receiving at least a portion of an image captured by an image capture device associated with a computing platform;

analyzing the received portion of the image to determine a looking direction of a subject at an object;

based on the looking direction, determining an engagement level of the subject with the object; and outputting image data associated with the image and an indication of whether the determined engagement level is in compliance with a required engagement level; and limiting, by a controller implemented in hardware logic or hard coded into a chip, an amount of the image data output so that the amount is insufficient for reconstruction of the received portion of the image.

20. A computer program product comprising a computer readable storage medium retaining program instructions which, when executed by a processor, causes the processor to perform a method comprising:

receiving at least a portion of an image captured by an image capture device associated with a computing platform;

analyzing the received portion of the image to determine a looking direction of a subject at an object;

based on the looking direction, determining an engagement level of the subject with the object; and outputting image data associated with the image and an indication of whether the determined engagement level is in compliance with a required engagement level; and limiting, by a controller implemented in hardware logic or hard coded into a chip, an amount of the image data output so that the amount is insufficient for reconstruction of the received portion of the image.

* * * * *